Patented Jan. 3, 1933

1,893,477

UNITED STATES PATENT OFFICE

FRANS CORNELIS VAN HEURN, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS FOR THE VULCANIZATION OF RUBBER LATEX OR OTHER RUBBER DISPERSIONS

No Drawing.   Application filed December 31, 1930.   Serial No. 505,980.

My invention concerns the vulcanization of rubber latices or other rubber dispersions, and has as its object to provide an improved process for producing uncoagulated vulcanized rubber latices or other rubber dispersions. Briefly stated, my invention consists in vulcanizing rubber in its dispersed state with substances which precipitate sulphur in an acid medium, and therefore the process according to my invention is more particularly applicable to rubber latices which are so stabilized as not to coagulate when the requisite quantity of acid for the precipitation of sulphur is added.

It is a known fact that also rubber in the form of a dispersion, hence, natural rubber latex, may be subjected to vulcanization, the advantage of such method being that, if the rubber is separated from the latex thus treated, for instance by an electrophoretic process or by dipping, subsequent vulcanization of the rubber formed and all the expense thereby entailed, may be avoided. It is also known in the vulcanization of latex to add fillers at the same time as the vulcanizing agents, accelerators, etc. The latex vulcanization may take place either cold or at raised temperature. The latex to be vulcanized should be stable with respect to the vulcanization agents as well as to the accelerators, fillers or other materials used.

In the known processes of vulcanizing latex prior to its coagulation, the vulcanization was always applied to latices having an alkaline reaction, and as vulcanizing agent use was made either of sulphur as such or in the form of a compound out of which sulphur could easily be precipitated in an alkaline medium, e. g. polysulphides. Now, I have found that substances which precipitate sulphur in an acid medium, for instance sodium or other thiosulphates, can advantageously be used in vulcanizing latex, and sulphur separated from such substances in the presence of acid such as hydrochloric or acetic acid or of a substance having an acid character, such as an acid salt, brings about vulcanization within a short time.

The latices required for this invention must be of such stability that they will not undergo coagulation on addition of the quantity of acid required to liberate free sulphur from the sulphur compound when introduced. Examples of suitable stable latices are those which can be obtained according to the processes described and claimed in U. S. patent applications Ser. No. 99,997, filed April 5th, 1926, Ser. No. 306,787, filed September 18th, 1928, and Ser. No. 322,101, filed November 26th, 1928. However, the application of my invention is not limited to the stabilized latices or stable rubber dispersions obtained by said processes. Thus, for instance rubber dispersion stabilized with saponin may also be used, provided they conform to the above stipulation.

The sulphur compound preferably in solution, may be added to the stable latex already containing the requisite quantity of acid or acid substance in order to liberate the sulphur, or the acid or acid substance in the requisite quantities may be added to the stable latex containing the sulphur compound, or both components may be added simultaneously.

The following examples illustrate the process:

I. To 400 grams of a stable rubber latex stabilized according to one of the processes referred to above—e. g. by adding a solution of aluminium chloride to the latex preserved with ammonia, the quantity of aluminium chloride added being larger than the equivalent quantity of ammonia in the latex—and containing 30 per cent of rubber was added such a quantity of hydrochloric acid as required to decompose 200 cc. of a saturated solution of sodium thiosulphate. The 200 cc. of said saturated solution of sodium thiosulphate were then added gradually and whilst stirring. Simultaneously a vulcanization accelerator, e. g. 2 gr. of diphenylguanidine, and 10 gr. of zinc oxide were also added, and the mixture was exposed to a temperature of about 90° C. After 60 minutes the percentage of combined sulphur calculated on the rubber amounted to 1 per cent.

II. A mixture of 200 gr. acid "latex gel" or stabilized latex dispersion containing 30 gr. rubber in total, 50 cc. of a 45% thiosulphate solution and 1.2 gr. p-nitrosodimethylaniline was heated during one and a half hours in a digester at 140° C., whereupon the percentage of combined sulphur calculated on the rubber amounted to 2.29 per cent.

The stable aqueous dispersions may, if desired, be concentrated and/or compounded with suitable ingredients prior to the vulcanizing treatment or if preferred suitable compounding ingredients may be incorporated after treatment. The aqueous dispersions of rubber may be artificially prepared in known manner from coagulated rubber or rubber reclaim or synthetic rubber.

The vulcanized aqueous dispersions of rubber obtained in accordance with this invention may be employed for numerous purposes. Thus they may be utilized in the manufacture of moulded or unmoulded rubber articles either by electrophoretic deposition or by dipping or by any other suitable means. They can also be employed in roadmaking or in the manufacture of floorings, waterproof-roofings, plastices, emulsion-paints, or for covering fruit or other articles of food with a layer of rubber for preservation purposes, or for impregnating or lining fabrics, woven thread, paper, etc.

What I claim is:

1. A process for the vulcanization of aqueous rubber dispersions, which comprises adding to a rubber dispersion which is stable in the presence of acids, a thiosulphate and a sufficient quantity of a substance having an acid character to precipitate sulphur out of the thiosulphate.

2. A process for the vulcanization of aqueous rubber dispersions, which comprises preparing a stabilized rubber dispersion of such acidity that sulphur will be precipitated on addition of a thiosulphate, adding a quantity of thiosulphate solution, causing sulphur to be precipitated and vulcanizing the dispersed rubber.

3. A process for the vulcanization of rubber latex, which comprises preparing a stabilized acid latex, adding a quantity of thiosulphate solution, causing sulphur to be precipitated and vulcanizing the rubber dispersed in the latex.

4. A process for the vulcanization of rubber latex, which comprises stabilizing the latex, adding a quantity of acid required to decompose the thiosulphate, thereupon adding a thiosulphate solution, causing sulphur to be precipitated and vulcanizing the rubber dispersed in the latex.

5. A process for the vulcanization of rubber latex, which comprises stabilizing the latex, adding a quantity of acid required to decompose the thiosulphate, thereupon adding a thiosulphate solution and a vulcanization accelerator, and subjecting the mixture to vulcanization at raised temperature.

6. A process for the vulcanization of rubber latex, which comprises preparing an acid latex, adding a quantity of thiosulphate solution and a vulcanization accelerator, and subjecting the mixture to vulcanization at raised temperature.

7. In the process of vulcanizing ammonia preserved rubber latex without substantial coagulation thereof, the steps comprising adding sufficient aluminum chloride to stabilize the latex against coagulation in the presence of acidic reagents, and adding a thiosulphate salt and hydrochloric acid to the latex.

8. In the process of vulcanizing rubber latex, the steps comprising stabilizing the latex against coagulation in the presence of acidic reagents and adding a thiosulphate salt and an acid to said latex.

9. In the process of vulcanizing rubber latex, the steps comprising stabilizing the latex against coagulation in the presence of acidic reagents and adding to said latex an acidic reagent and a salt which precipitates sulphur in the presence of acidic reagents.

In testimony whereof I have affixed my signature.

FRANS CORNELIS VAN HEURN.